United States Patent
Li et al.

(10) Patent No.: US 10,921,907 B2
(45) Date of Patent: Feb. 16, 2021

(54) MULTIPURPOSE STYLUS WITH EXCHANGEABLE MODULES

(71) Applicant: Apple Inc., Cupertino, CA (US)

(72) Inventors: Qiuming Li, Santa Clara, CA (US); Nicholas M. Mcdonnell, San Jose, CA (US); Michael J. Newman, Sunnyvale, CA (US); Xiaoyu Cheng, Sunnyvale, CA (US); Swapnil S. Jain, Union City, CA (US); Hardik Joshi, Sunnyvale, CA (US); Neeraj Gupta, San Jose, CA (US); Mohit Narang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 130 days.

(21) Appl. No.: 15/671,006

(22) Filed: Aug. 7, 2017

(65) Prior Publication Data

US 2018/0081456 A1 Mar. 22, 2018

Related U.S. Application Data

(60) Provisional application No. 62/396,693, filed on Sep. 19, 2016.

(51) Int. Cl.
| | | |
|---|---|---|
| *G06F 3/0354* | (2013.01) | |
| *G06F 3/01* | (2006.01) | |
| *G06F 3/038* | (2013.01) | |
| *G06F 3/0346* | (2013.01) | |
| *G06F 3/0488* | (2013.01) | |
| *G06F 3/0484* | (2013.01) | |

(52) U.S. Cl.
CPC .......... *G06F 3/03545* (2013.01); *G06F 3/016* (2013.01); *G06F 3/017* (2013.01); *G06F 3/038* (2013.01); *G06F 3/0346* (2013.01); *G06F 3/0383* (2013.01); *G06F 3/04883* (2013.01); *G06F 3/04847* (2013.01); *G06F 2203/0384* (2013.01); *G06F 2203/04807* (2013.01)

(58) Field of Classification Search
None
See application file for complete search history.

(56) References Cited

U.S. PATENT DOCUMENTS

| | | |
|---|---|---|
| 9,329,703 B2 | 5/2016 | Falkenburg et al. |
| 2005/0161961 A1 | 7/2005 | Ruff et al. |
| 2011/0250002 A1 | 10/2011 | Vora |
| 2012/0194484 A1 | 8/2012 | Lehman |
| 2012/0331546 A1* | 12/2012 | Falkenburg .......... G06F 3/03545 726/16 |
| 2013/0194242 A1 | 8/2013 | Park et al. |
| 2016/0291706 A1* | 10/2016 | Trutna ................ G06F 3/03545 |
| 2017/0108954 A1* | 4/2017 | Tang .................... G06F 3/0383 |

* cited by examiner

*Primary Examiner* — Brian M Butcher
(74) *Attorney, Agent, or Firm* — Morgan, Lewis & Bockius LLP (57) ABSTRACT

An input device, such as a stylus, can include a main body comprising a main body connector for connecting to a charger to charge a power source of the stylus. A separate functional end module is removable from the main body to expose the main body connector. The functional end module includes a functional component and a module connector that communicates with the main body via the main body connector. Various different functional end modules can be interchangeable to provide a variety of distinct features to the stylus.

20 Claims, 6 Drawing Sheets

MULTIPURPOSE STYLUS WITH EXCHANGEABLE MODULES

CROSS-REFERENCE TO RELATED APPLICATION(S)

This application claims the benefit of U.S. Provisional Application No. 62/396,693, entitled "MULTIPURPOSE STYLUS WITH EXCHANGEABLE MODULES," filed Sep. 19, 2016, the entirety of which is incorporated herein by reference.

FIELD

The present description relates generally to touch-based input devices, such as styluses. More particularly, the present embodiments relate to touch-based input devices that have removable and exchangeable components.

BACKGROUND

A variety of handheld input devices exist for detecting input from a user during use. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some electronic devices that include a display surface and/or a touch panel can be used in combination with a stylus or other touch-based input device. In accordance with embodiments disclosed herein, improved touch-based input devices, such as styluses, can provide input detection for generating and removing markings that are digitally recorded by an external device. The stylus can provide interchangeability of various removable components, such as removable functional end modules that cover a connector for charging and communicating with the stylus. The various removable components each provide distinct features, thereby allowing the user to select various capabilities by employing each of the various functional end modules.

Figure 1:
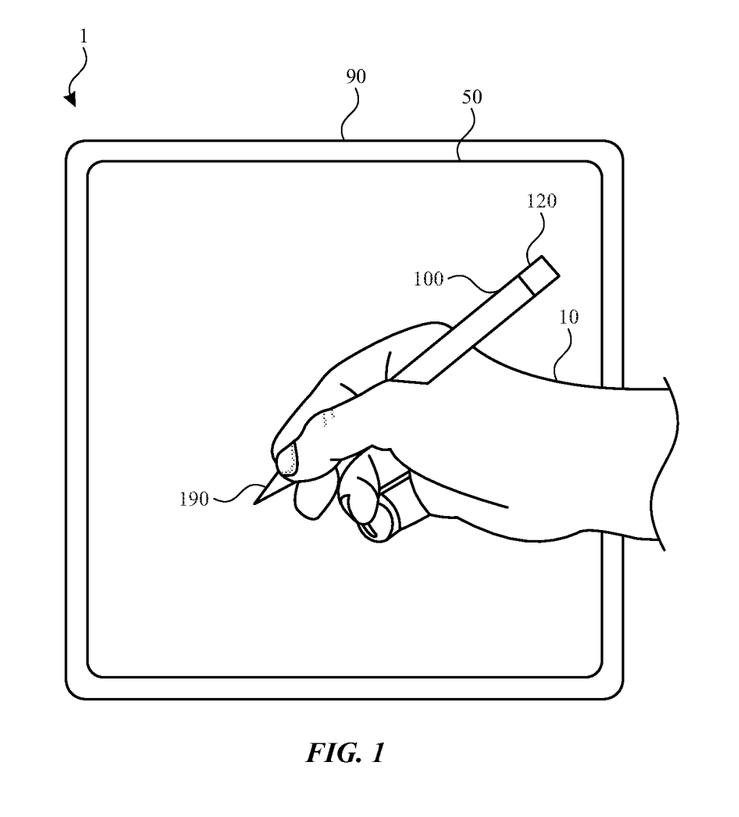
FIG. 1 illustrates a view of a system including a stylus and an external device, according to some embodiments of the subject technology.

A touch-based input device in accordance with embodiments disclosed herein can include any device that is held, worn, or contacted by a user for receiving inputs from the user. The touch-based input device can be used alone or in conjunction with another device. For example, FIG. 1 illustrates a system 1 including a stylus 100 and an external device 90, having an interface surface 50, according to some embodiments of the subject technology. The stylus 100 can be held by a user 10 and operate as a touch-based input device for use with the external device 90. The interface surface 50 can include a display surface and/or a touch panel for interacting with the stylus 100 when contacted thereby. For example, the stylus 100 can include a tip module 190 for contacting the interface surface 50. Such contact can be detected by the external device 90 and/or the stylus 100. For example, the stylus 100 can include one or more sensors that detect when the tip module 190 contacts the interface surface 50. Such sensors can include one or more contact sensors, capacitive sensors, touch sensors, cameras, piezoelectric sensors, pressure sensors, photodiodes, and/or other sensors operable to detect contact with the interface surface 50.

Figure 2:
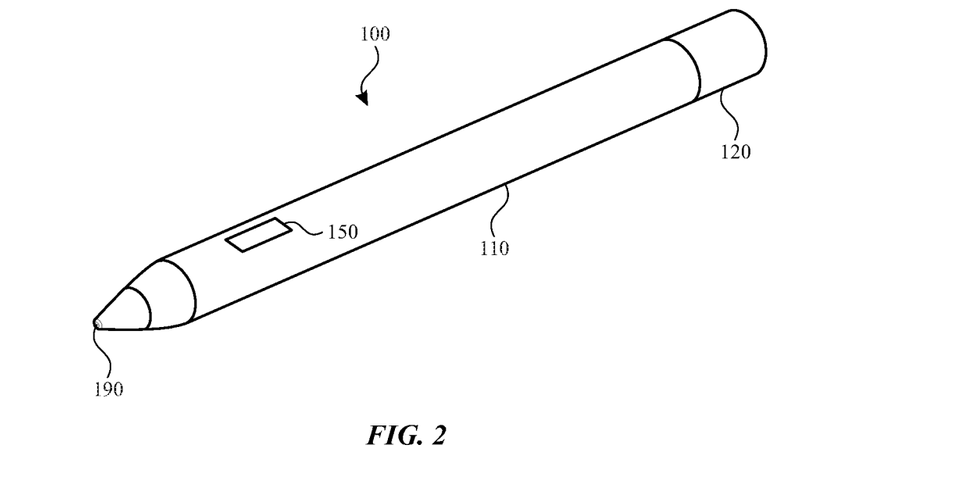
FIG. 2 illustrates a perspective view of the stylus of FIG. 1, according to some embodiments of the subject technology.

The stylus 100 can support handling and operation by a user. FIG. 2 illustrates a stylus 100, according to some embodiments of the subject technology. According to some embodiments, for example as illustrated in FIG. 2, the stylus 100 can include a main body 110 that extends at least a portion of the total length of the stylus 100. A user can grip the stylus 100 at the main body 110, for example near the tip module 190 of the stylus 100. Components of the stylus 100 can be positioned to receive tactile input from the user. For example, the main body 110 can include an input component such as a button 150 set within the main body 110. The button 150 can include a switch, knob, lever, force sensor, and/or another input component.

Figure 3:
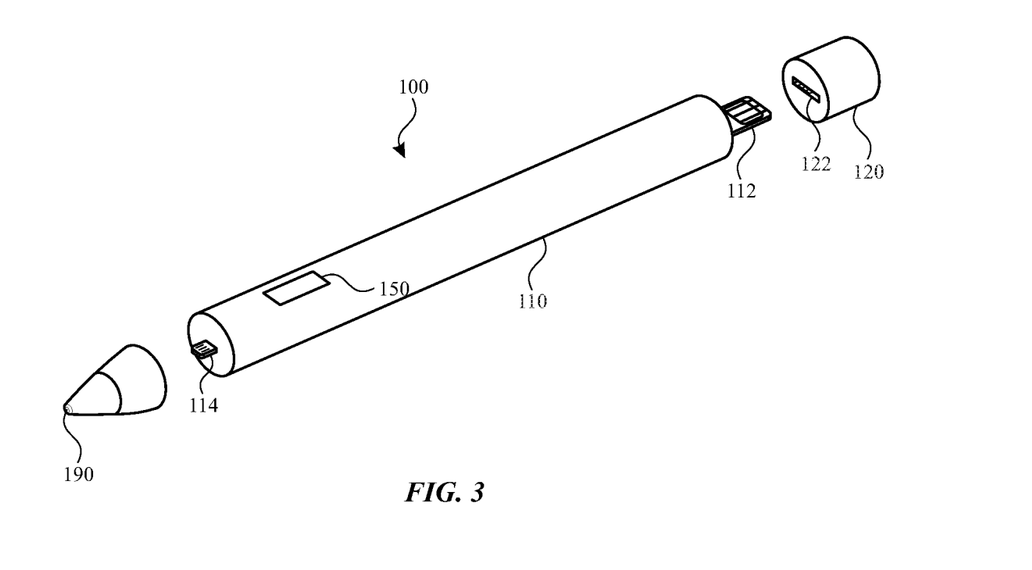
FIG. 3 illustrates a perspective view of the stylus of FIG. 1, according to some embodiments of the subject technology.

The stylus 100 can include components for charging and communicating with the stylus, with the components being coverable by a functional end module that provides additional functionality. FIG. 3 illustrates the stylus 100 with the tip module 190 removed from a first end thereof and a functional end module 120 removed from a second end thereof, according to some embodiments of the subject technology. According to some embodiments, for example as illustrated in FIG. 3, the main body 110 of the stylus 100 can include a main body connector 112 for receiving electrical power and/or data communications from another device (e.g., the external device 90). The functional end module 120 can perform one or more functions and can be removably attached to the main body 110 for covering and protecting the main body connector 112. When the functional end module 120 is removed from the main body 110, the main body connector 112 is exposed for insertion into a charging or data communication port of another device (e.g., the external device 90). When the functional end module 120 is attached to the main body 110, a module connector 122 of the functional end module 120 can connect to the main body connector 112 of the main body 110. The connection between the main body connector 112 and the module connector 122 can provide power and/or data communication between the main body 110 and the functional end module 120. Alternatively or in combination, power and/or data communication between the main body 110 and the functional end module 120 can be provided via other connections and/or wirelessly.

According to some embodiments, the functional end module 120 includes one or more functional components 130 (not shown in FIG. 3) for receiving an input and/or providing an output. Various functions performed by the functional end modules 120 are discussed further herein. The functional component 130 can be located at a terminal end of the functional end module 120 that is located opposite the tip module 190 of the stylus 100. According to some embodiments, the functional component 130 can include a tactile sensor, such as a push/touch button, a twist button that springs back to a default position when not operated by a user, and/or a twist mechanism that produces incremental clicks when moving between various positions. According to some embodiments, the functional component 130 can include other orientation detectors, gyroscopes, accelerometers, biometric readers, displays, switches (e.g., dome switches), buttons, speakers, compass, microphones, cameras, voice coils, and/or other components. User inputs provided to the functional component 130 can generate signals that are communicated to the external device 90 for performance of an action in accordance with the signal and the user input, as discussed further herein.

According to some embodiments, multiple functional end modules 120 can be provided and interchanged on the main body 110 of the stylus 100. Each of a variety of functional end modules 120 can have a different functional component or other component to provide distinct functionally. Accordingly, each functional end module 120 can act as a module of the stylus 100 to provide certain features to the stylus 100 based on the user's selection of functional end module 120. The stylus 100 can detect which of a variety of functional end modules is installed and perform corresponding actions upon receipt of inputs from the functional end module 120. Each functional end module 120 can communicate with the main body 110 via the main body connector 112 and the module connector 122 or by other mechanisms. Each functional end module 120 can communicate with the external device 90 via the main body 110 or by other mechanisms.

According to some embodiments, the tip module 190 includes one or more functional components 192 (not shown in FIG. 3) for receiving an input and/or providing an output. The functional component 192 can be located at a terminal end of the functional end module 120 that is located opposite the tip module 190 of the stylus 100. According to some embodiments, the functional component 192 can include a tactile sensor that detects when the tip module 190 is pressed against a surface, such as the interface surface 50. User inputs provided to the functional component 192 can generate signals that are communicated to the external device 90 for performance of an action in accordance with the signal and the user input, as discussed further herein. According to some embodiments, the functional component 192 can provide outputs. For example, the functional component 192 of the tip module 190 can include an ink dispenser for physically writing on a surface, such as a whiteboard. By further example, the functional component 192 of the tip module 190 can include a light source, such as a laser pointer. Different sensors can also be integrated into the tip module 190, such as a color sensor or ambient light sensor.

According to some embodiments, multiple tip modules 190 can be provided and interchanged on the main body 110 of the stylus 100. Each of a variety of tip modules 190 can have a different functional component or other component to provide distinct functionally. Accordingly, each tip module 190 can act as a module of the stylus 100 to provide certain features to the stylus 100 based on the user's selection of tip module 190. The stylus 100 can detect which of a variety of functional end modules is installed and perform corresponding actions upon receipt of inputs from the tip module 190. Each tip module 190 can communicate with the main body 110 via a tip connector 114 or by other mechanisms. Each tip module 190 can communicate with the external device 90 via the main body 110 or by other mechanisms.

According to some embodiments, the functional end module 120 and the tip module 190 can operate independently of each other or in concert. For example, signals from the functional end module 120 can affect how the external device 90 responds to signals from the tip module 190. By further example, signals from the tip module 190 can affect how the external device 90 responds to signals from the functional end module 120. Operation of each of the functional end module 120 and the tip module 190 are further discussed herein.

Figure 4:
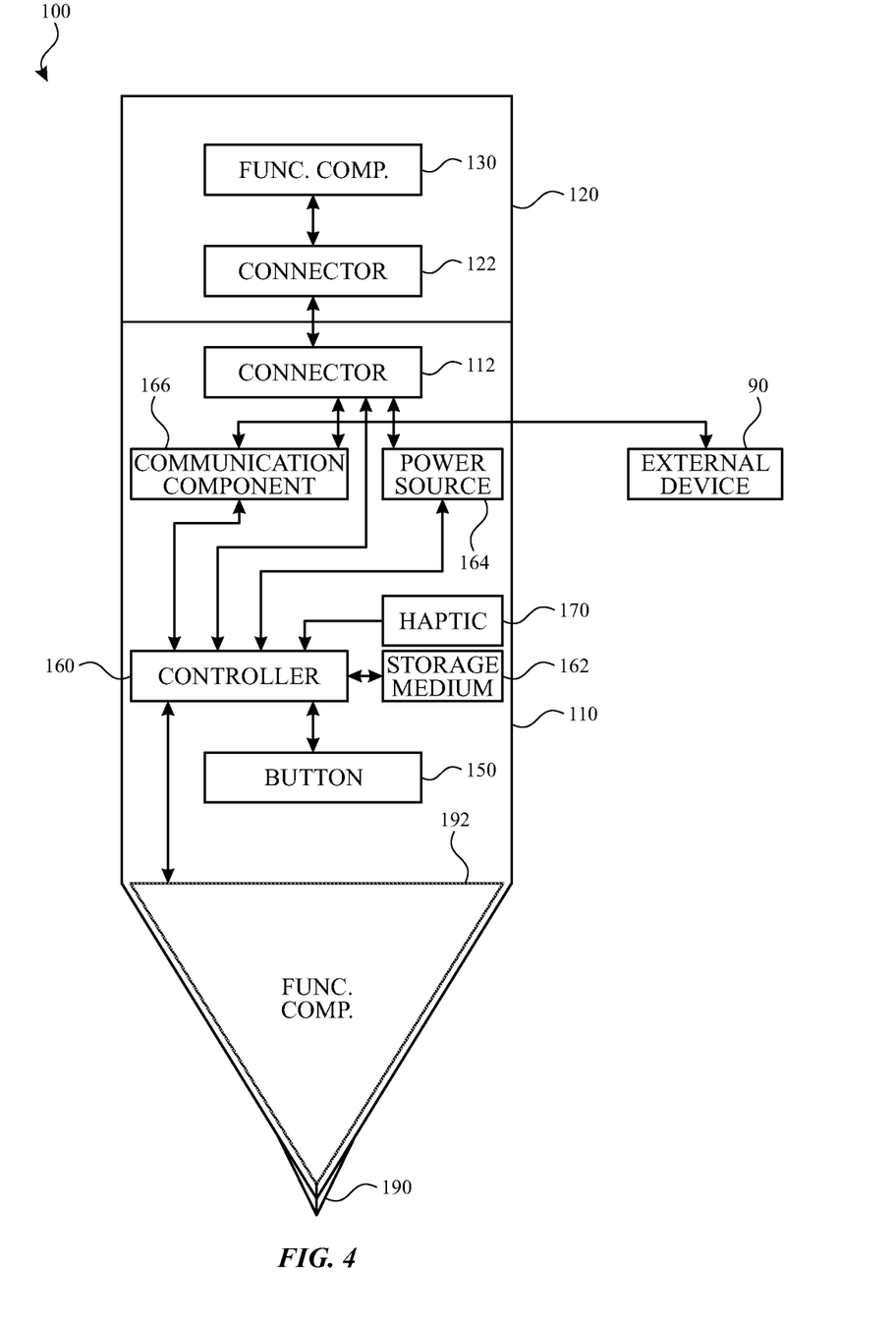
FIG. 4 illustrates a block diagram illustrating the stylus and the external device of FIG. 1, according to some embodiments of the subject technology.

The stylus 100 can be provided with components that facilitate the operation thereof, including use with the external device 90. FIG. 4 illustrates various components of the stylus 100, according to some embodiments of the subject technology.

According to some embodiments, the stylus 100 can include the functional component 192 at a tip module 190 of the stylus 100 for sensing when the tip module 190 is contacting a surface, such as the interface surface 50 of the external device 90. The functional component 192 can include one or more contact sensors, capacitive sensors, touch sensors, cameras, piezoelectric sensors, pressure sensors, photodiodes, and/or other sensors.

According to some embodiments, the stylus 100 can include a controller 106 and non-transitory storage media 162. The non-transitory storage media 162 can include, for example, a magnetic storage medium, optical storage medium, magneto-optical storage medium, read-only memory, random access memory, erasable programmable memory, flash memory, or combinations thereof. According to some embodiments, the controller 106 can execute one or more instructions stored in the non-transitory storage media 162 to perform one or more functions. For example, the non-transitory storage media 162 can store one or more haptic profiles that the touch implement may utilize to simulate one or more textures. In some cases, the stylus 100 may retrieve a specific haptic profile utilizing one or more references and/or other codes detected from a surface utilizing the functional component 192 and/or received from an electronic device associated with the surface.

According to some embodiments, the stylus 100 can include a communication component 166 for communicating with the external device 90, the functional end module 120, and/or another device. The communication component 166 can include one or more wired or wireless components, WiFi components, near field communication components, Bluetooth components, and/or other communication components. The communication component 166 can include one or more transmission elements, such as one or more antennas. Alternatively or in combination, the communication component 166 can include an interface for a wired connection to the external device 90, the functional end module 120, and/or another device.

According to some embodiments, the stylus 100 can include a power source 164, such as one or more batteries and/or power management units. The stylus 100 can include components for charging the power source 164, such as the main body connector 112. Alternatively or in combination, the stylus 100 can include wireless charging capabilities for charging the power source 164. According to some embodiments, the stylus 100 can include components for converting mechanical energy into electrical energy. For example, the stylus 100 can include a piezoelectric device and/or a coil and magnetic components for generating electrical power upon mechanical movement thereof.

According to some embodiments, the stylus 100 can include a haptic device 170 for providing haptic feedback to a user. One or more haptic devices 170 can be located in the main body 110 and/or the functional end module 120. Operation of the haptic device 170 of the stylus 100 can be performed in combination with haptic feedback provided directly from the external device 90. Use of the button 150 and/or the functional end module 120 can be accompanied by haptic feedback to confirm receipt of a user input via the button 150 and/or the functional end module 120. The haptic feedback can be provided in accordance with operation of an application (e.g., game) on the external device.

According to some embodiments, the stylus 100 can include other components including, for example, orientation detectors, gyroscopes, accelerometers, biometric readers, displays, sensors, switches (e.g., dome switches), buttons, speakers, microphones, cameras, voice coils, and/or other components. According to some embodiments, one or more of the components shown in FIG. 4 as being located within the main body 110 can be located within the functional end module 120.

The tip module 190 and the functional end module 120 of the stylus 100 can be used for virtually creating and erasing markings while drawing or writing on a surface. The stylus 100 can be used for drawing or writing by contacting the interface surface 50 of the external device 90 with the tip module 190 of the stylus 100. According to some embodiments, the functional component 192 in the tip module 190 and the functional component 130 in the functional end module 120 can each detect tactile input from a user. For example, the tip module 190 and the functional end module 120 can be used to contact the interface surface 50 of the external device 90. When the tip module 190 contacts the interface surface 50, the external device 90 can record and/or display a marking at the location of contact by the tip module 190. The external device 90 can detect the contact and/or receive a communication from the stylus 100 regarding usage of the tip module 190. When the functional end module 120 contacts the interface surface 50, the external device 90 can remove (e.g., erase) a marking, such as a marking previously recorded and/or displayed at the location of contact by the tip module 190, as if using a virtual eraser to erase a marking on the interface surface 50.

The functional end module 120 and/or the button 150 of the stylus 100 can be used to change settings of the external device 90. According to some embodiments, a user can provide primary inputs via the tip module 190 and secondary inputs via the functional end module 120 and/or the button 150. While the stylus 100 is used for drawing or writing, inputs provided with the tip module 190 can be recorded by the external device 90 with markings, lines, or shapes having a variety of characteristics. For example, the recorded markings can have a certain shape, thickness, and color. When the user operates the functional end module 120 and/or the button 150 to create a signal, the external device 90 can interpret the signal as a command to apply one or more characteristics to markings generated by subsequent input from the stylus 100. Accordingly, subsequent contact between the tip module 190 of the stylus 100 and the interface surface 50 of the external device 90 can be recorded and/or displayed as markings having the one or more characteristics determined by use of the functional end module 120 and/or the button 150. According to some embodiments, characteristics of a marking can be altered as the marking is being generated. For example, while a marking is being drawn with the tip module 190 of the stylus 100, the button 150 can be pressed to change a characteristic (e.g., shape, thickness, color, etc.) of the marking. After the button 150 is pressed, additional portions of the marking are recorded and/or displayed in accordance with the new characteristic. As such, a continuous marking can have varying characteristics based on selections made by the user while drawing the marking. For example, a marking created by the user can have different segments with different colors by pressing the button 150 while drawing the marking.

According to some embodiments, the input provided to the functional end module 120 and/or the button 150 can generate a signal based on a characteristic of the input. For example, a user input can be evaluated to determine a duration of a user input, a number of user inputs, a number of user inputs within a span of time, a direction or pathway of a gesture, and/or a magnitude of a force. Based on a determined characteristic of the input, a signal can be generated in accordance with preprogrammed actions associated with predetermined characteristics of the input. According to some embodiments, a single press on the functional end module 120 and/or the button 150 can change a characteristic (e.g., shape, thickness, color, etc.) of a marking recorded by the external device 90. According to some embodiments, a sustained press on the functional end module 120 and/or the button 150 can activate the stylus 100 (e.g., from a low-power consumption sleep mode) and/or establish a communication link between the stylus 100 and the external device 90. According to some embodiments, a sustained press on the functional end module 120 and/or the button 150 can instruct the external device 90 to display a menu. Additional inputs can scroll through and/or select options displayed within the menu. According to some embodiments, a sustained press on the functional end module 120 and/or the button 150 can initiate an activity of a component of the stylus 100 (e.g., located at the functional end module 120). The stylus 100 can provide haptic feedback (e.g., via a haptic device 170) in response to receipt of inputs described herein, thereby providing an indication that the input is received.

Figure 5:
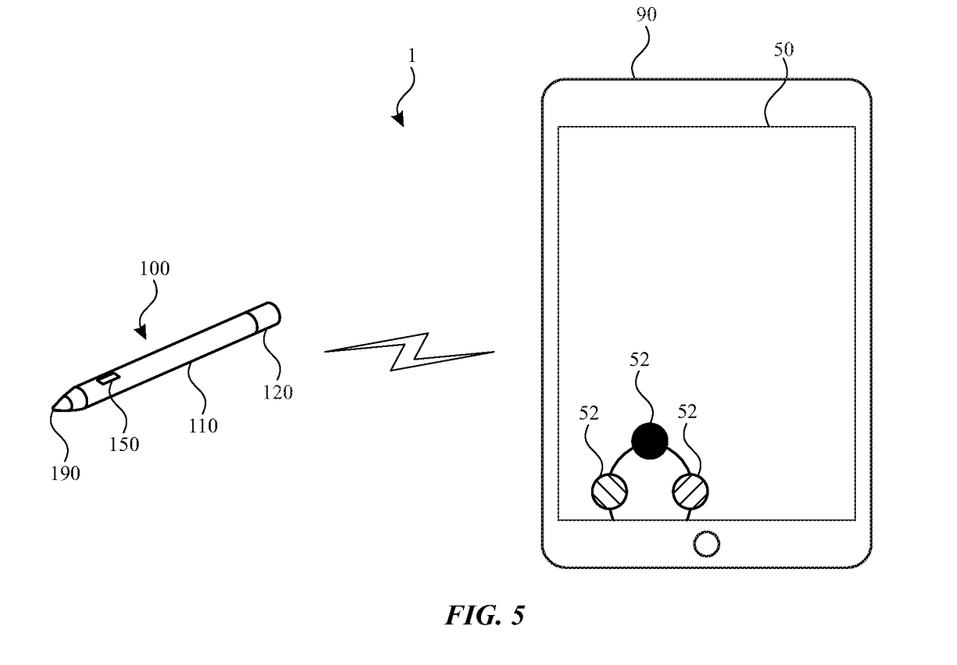
FIG. 5 illustrates a view of a system including a stylus and an external device, according to some embodiments of the subject technology.
Figure 6:
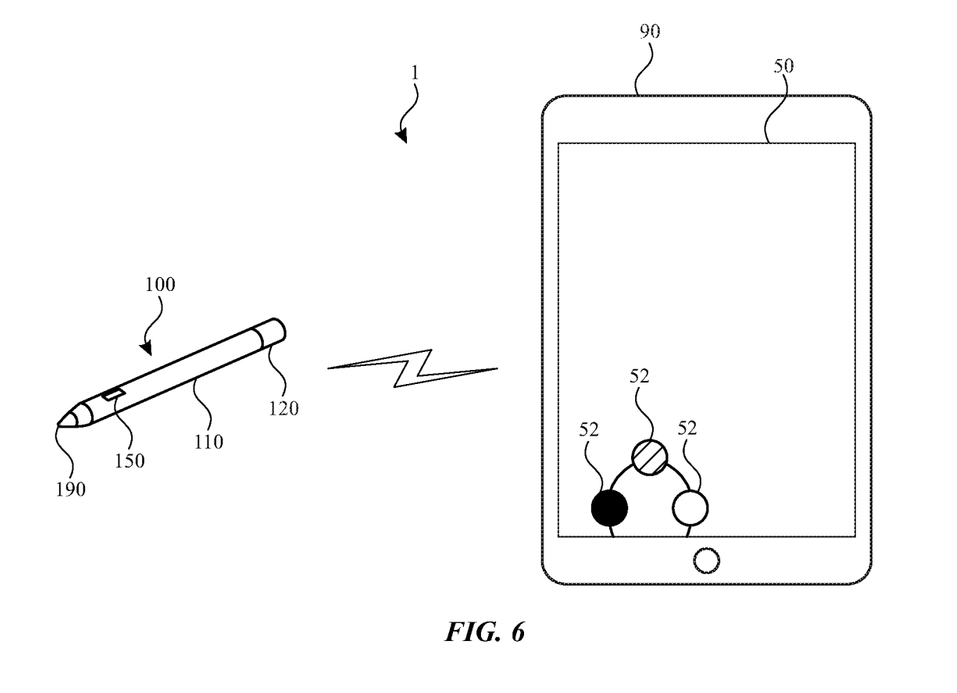
FIG. 6 illustrates a view of the system of FIG. 5, according to some embodiments of the subject technology.

The external device 90 can display feedback relating to the user inputs provided to the stylus 100. FIGS. 5 and 6 illustrate various selections 52 displayed on the interface surface 50 of the external device 90, according to some embodiments of the subject technology. According to some embodiments, for example as illustrated in FIG. 5, multiple selections 52 are displayed, with each of the selections 52 corresponding to a setting or option that is available to the user. For example, the selections 52 can correspond to a characteristic (e.g., shape, thickness, color, etc.) of a marking. One of the selections 52 can be an active selection that is applied to markings. The other selections 52 that are displayed can be provided as a reference to a user as potential selections. As shown in FIG. 6, when the user provides input (e.g., to the functional end module 120 and/or the button 150), the active one of the selections 52 can change to another one of the selections 52 that were previously displayed, and the new active one of the selections 52 can be applied to subsequent markings. With each detected user input, the display of the selections 52 can change as an indicator to the user. For example, the display of the selections 52 can rotate, scroll, slide, shift, change brightness, change opacity, change size, or otherwise be altered to indicate the selection by the user input as well as the current active one of the selections. The selections 52 that are made available to the user can be preprogrammed, selected by a user, for selected based on learning and the user's history (e.g., the colors most commonly selected by the user are presented for possible selection by the user).

Figure 7:
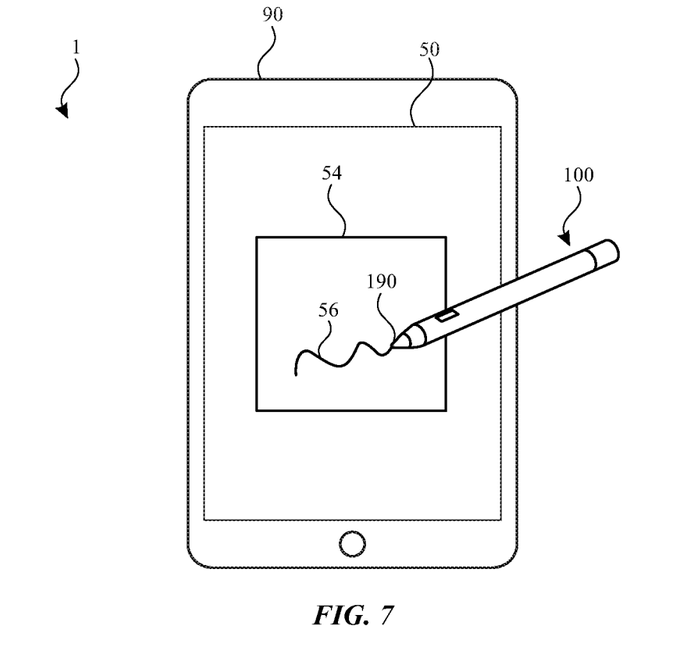
FIG. 7 illustrates a view of a system including a stylus and an external device, according to some embodiments of the subject technology.
Figure 8:
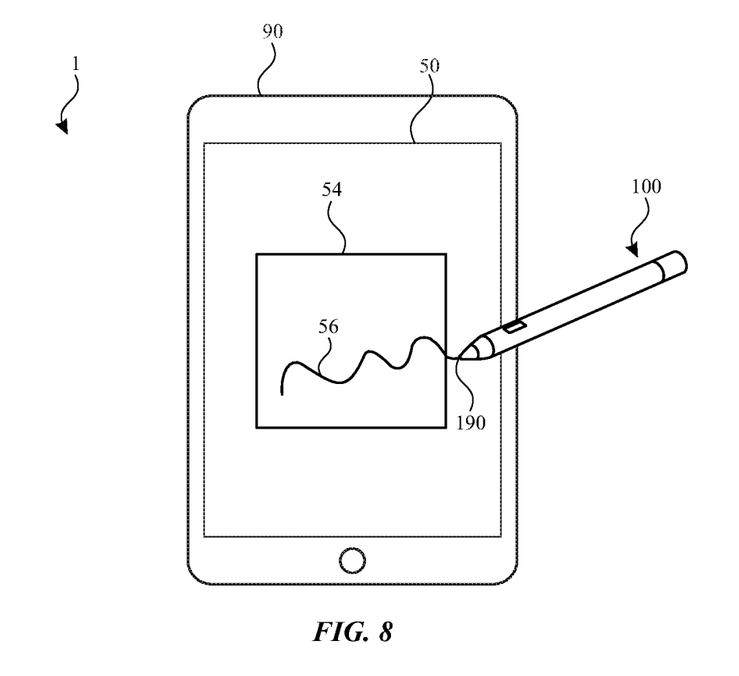
FIG. 8 illustrates a view of the system of FIG. 7, according to some embodiments of the subject technology.

The stylus 100 can provide tactile feedback to a user based on markings generated by the user. FIGS. 7 and 8 illustrate markings 56 drawn with respect to a boundary 54, according to some embodiments of the subject technology. According to some embodiments, for example as illustrated in FIG. 7, the tip module 190 of the stylus can be used to contact the interface surface 50 of the external device 90. A corresponding marking 56 is recorded and displayed on the interface surface 50 at the location of the tip module 190. Some or all of a boundary 54 can be displayed on the interface surface 50 as a reference for the user. Additionally or alternatively, some or all of the boundary 54 is not visible or displayed on the interface surface 50, but rather is recorded by the external device 90 for reference in response to user input. Whether or not the boundary 54 is displayed or visible to a user, the external device can compare the user input to the known boundary 54 and response as described herein. When the tip module 190 or the corresponding marking 56 is outside the boundary 54, the stylus 100 can provide haptic feedback (e.g., via a haptic device 170) to indicate to a user that the user is drawing outside the boundary 54. When the tip module 190 or the corresponding marking 56 returns to within the boundary 54, the stylus 100 can cease providing haptic feedback. The boundary 54 can be selected to indicate an area to be marked or colored. The boundary 54 can correspond to a display of a letter, number, or other shape for the user to trace with the stylus 100. Accordingly, the haptic feedback provided by the stylus 100 can indicate to the user when correction is needed to conform to the letter, number, or other shape that is to be traced by the user. Analytics can be performed to determine what portion and/or proportion of the marking is inside or outside the boundary 54 and provide corresponding feedback regarding the user's performance.

The stylus 100 can provide tactile feedback to a user based on other activities involving the stylus 100. According to some embodiments, operation of the haptic device 170 can render texture sensations to simulate drawing on a textured surface with the stylus 100. Vibrations can be transmitted to the user from the haptic device 170 as the stylus 100 is determined to be moving across the interface surface 50 of the external device 90. The force of the contact, the speed of the stylus 100, the orientation of the stylus 100, and/or the textured surface to be simulated (e.g., paper, stone, wood, etc.) can provide inputs to determine the operation of the haptic device 170.

The stylus 100 can provide tactile feedback to a user based on colors of a display of the external device 90 to assist users who are unable to fully distinguish colors of the display. According to some embodiments, operation of the haptic device 170 can be used when the stylus 100 contacts certain colors. A user can interpret the haptic feedback to infer the presence of colors that the user is otherwise unable to distinguish. A user can provide a selection of colors for which haptic feedback is desired, and the external device 90 can instruct the haptic device 170 of the stylus 100 to provide the haptic feedback when the stylus 100 is brought to the selected colors displayed on the interface surface 50. For example, when a user brings the stylus 100 to a first color (e.g., red) displayed on the interface surface 50, a first pattern (e.g., double vibration) of haptic feedback can be provided by the haptic device 170. When the user brings the stylus 100 to a second color (e.g., green) displayed on the interface surface 50, a second pattern (e.g., triple vibration) of haptic feedback can be provided by the haptic device 170. The applied pattern of haptic feedback can correspond to certain colors based on preprogrammed or user-defined selections.

The stylus 100 can be used to record audio data. For example, the functional component 130 of the functional end module 120 can include a microphone. Alternatively or in combination, the main body 110 of the stylus 100 can include a microphone. A microphone of the stylus 100 can be used to record audio data, such as speech, music, reminders, lecture notes, command to a virtual assistant, etc. The audio data can be stored in the stylus 100, transmitted to an external device 90, and/or transcribed into text, where applicable. Recording of audio data can be initiated and/or terminated by operation of a sensor, such as the button 150, a functional component of the functional end module 120, or another tactile sensor of the stylus 100.

According to some embodiments, a stylus 100 can be used to record written data and audio data. For example, the user can use the tip module 190 of the stylus 100 to write on the interface surface 50 of the external device 90, which records the written data provided by the stylus 100. The user can also operate the stylus 100 to record audio data, such as the user's voice. The stylus 100 and/or the external device 90 can transcribe the recorded audio data into text. The text can be displayed among the recorded written data on the interface surface 50 of the external device 90. The user can operate the stylus 100 to edit, move, and/or manipulate the text. For example, the text can be displayed in a box that is separate from the recorded written data. Both the audio data and the transcribed text can be recorded, such that the user can play back the audio, for example upon selecting the text box or a feature thereof. Alternatively or in combination, the audio data can be recorded and displayed in a box that does not contain any transcribed text.

Figure 9:
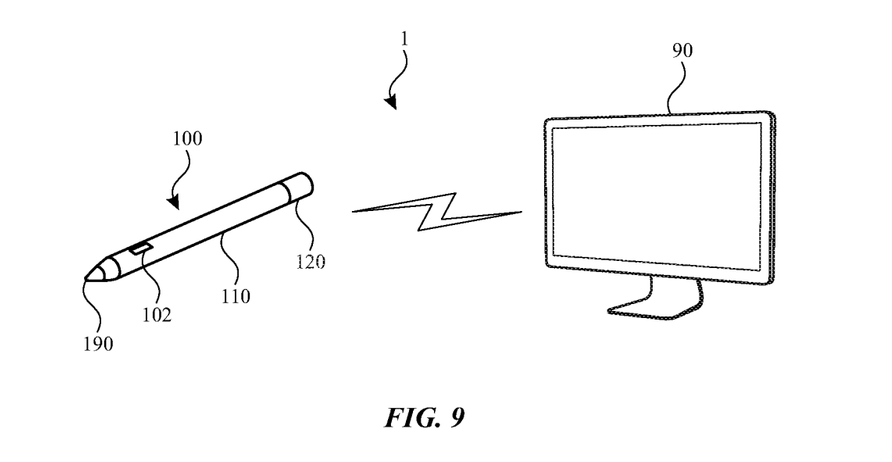
FIG. 9 illustrates a view of a system including a stylus and an external device, according to some embodiments of the subject technology.

Gestures can be detected by the stylus 100 as user inputs that include information that is stored locally and/or transmitted to remote devices for use by others. The stylus 100 can include an accelerometer, a gyroscope, and/or a compass. FIG. 9 illustrates the stylus 100 in communication with the external device 90, according to some embodiments of the subject technology. According to some embodiments, for example as illustrated in FIG. 9, the stylus 100 can detect gestures made by a user holding the stylus 100. When a gesture satisfies a predetermined threshold or other characteristic of gestures, the stylus 100 can transmit a signal to the external device 90 to perform one or more actions. According to some embodiments, a stylus 100 can be programmed to detect gestures only when a user is also providing a separate input, such as pressing the button 150 and/or the functional end module 120. Such a prerequisite can limit detection of false inputs that are not intended by the user.

The stylus 100 can include a tip module 190 that provides markings on a physical surface. For example, the stylus 100 can include a tip module 190 with ink, paint, lead, or graphite. The stylus 100 can allow tips to be interchanged by a user. The tip module 190 can also include the functional component 192, such that writing on a physical surface is also detected as inputs by the stylus 100. Accordingly, handwriting that is generated on the physical surface can be digitally recorded by the stylus 100 and/or transmitted to the external device 90. Movement and position of the stylus 100 can be detected with the accelerometer, the gyroscope, and/or the compass. Where contact is detected at the tip module 190, the stylus 100 can record the position and record that a marking is generated at the position. These records allow handwriting and other user inputs to be recorded digitally. The records can be stored on the stylus 100 during a session and transmitted to an external device 90 when the stylus 100 is placed in communication with the external device 90.

According to some embodiments, a user can use the tip module 190 of the stylus 100 to generate markings that are recorded digitally by the external device 90. When a user shakes the stylus 100, the stylus 100 can send a signal to the external device 90 to undo a prior action, such as generation of the previous marking. The external device performs an action to undo the recording of the previous marking based on the signal. Other preprogrammed or user-defined actions can be applied based on the signal. Other gestures are contemplated, such as moving, tilting, etc.

According to some embodiments, gestures detected by the stylus 100 can be used to control operation of particular devices. For example, where the external device 90 is a television or media device connected to a television, the stylus 100 can detect gestures and send corresponding signals to pause playback, advance playback by a certain rate or amount, reverse playback by a certain rate or amount, and/or advance or reverse to another episode, track, or photo. The stylus 100 can connect to the television or media device directly and/or via an intermediate device.

Figure 10:
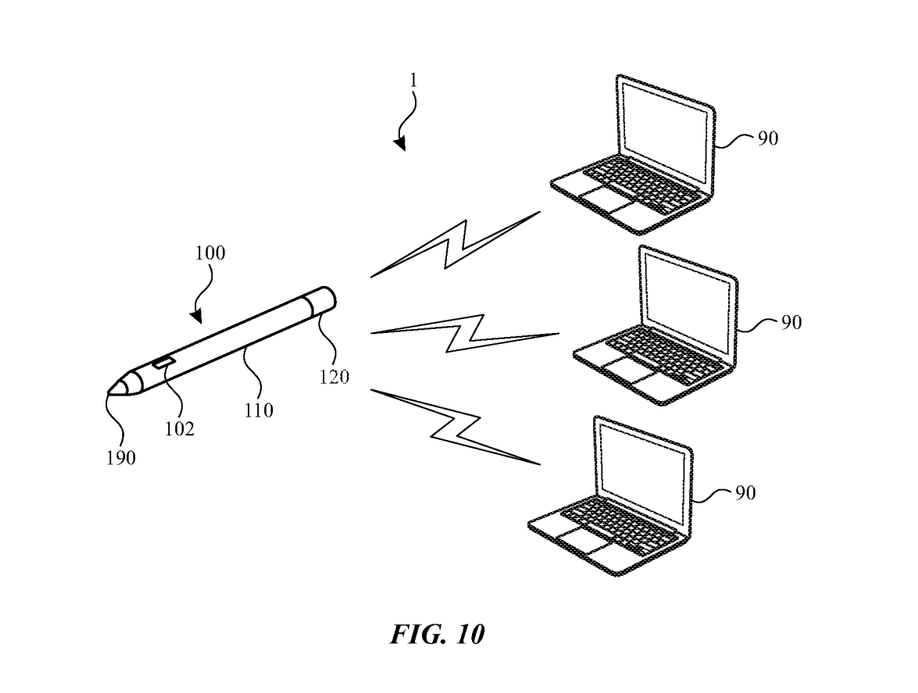
FIG. 10 illustrates a view of a system including a stylus and external devices, according to some embodiments of the subject technology.

According to some embodiments, gestures detected by the stylus 100 can be used to transmit signals to multiple external devices 90. For example, the stylus 100 can be used to generate and record data (e.g., markings, voice recording, photos). The nature of the data can be determined by the functional end module 120 that is installed onto the stylus 100. After generating and recording the data, the stylus 100 can detect a gesture from a user and transmit the data to multiple external devices 90. For example, a user can generate data during a presentation by operating the stylus 100. The user can then perform a gesture that, when detected by the stylus 100, causes the data to be transmitted to external devices 90 that are operated by the audience and/or other participants for the presentation. The stylus 100 can connect to the external devices 90 directly and/or via an intermediate device. For example, the operators of the external devices 90 can subscribe to an access point that broadcasts the data from the stylus 100. The data can be broadcast, for example, via a wireless connection. By further example, the data can be broadcast to any external devices 90 within a communication range of an access point.

The stylus 100 can be used to edit a presentation displayed on an external device 90. For example, the external device 90 can display prepared data, and a user can operate the stylus 100 to edit, supplement, or delete displayed data. The inputs provided by the stylus 100 can be recorded in the stylus 100 and/or the external device 90. Separate versions of the display data can be recorded, such that original and altered data can be accessed later. Upon detection by the stylus 100 of a user gesture, the stylus 100 can transmit the original and/or altered data to other external devices, such as those of the audience and/or other participants for a presentation, as described herein.

According to some embodiments, gestures detected by the stylus 100 can be used to detect when a user is in danger. The stylus 100 can be worn or carried by a user and detects an abrupt fall with an accelerometer. The stylus 100 can then send an alert (e.g., wirelessly) to an external device 90. The external device 90 can be a local device in communication with the stylus 100 or a remote device that communicates with the stylus 100 via a local device, a server, the internet, etc. The alert can be transmitted to individuals associated with the user, to alert the associates regarding a potential threat to the user.

According to some embodiments, the functional end module 120 can include a camera. According to some embodiments, the functional end module 120 can include a memory storage. According to some embodiments, the functional end module 120 can include a breathalyzer or other gas sensor. According to some embodiments, the functional end module 120 can include a speaker.

According to some embodiments, the tip module 190 of the stylus 100 can include an optical sensor, such as an RGB sensor for detecting color of a sample. The user can bring the optical sensor to the sample, and the stylus 100 can record the color of the sample. The stylus 100 can then transmit the color to the external device 90. Where the external device 90 includes a display on the interface surface 50, the user can, for example by operating the stylus 100, apply the color of the sample to at least a portion of the display. According to some embodiments, the color of the sample can be applied to an object that is displayed on the external device 90. For example, a user can scan a color of a sample and apply it to an object in a photograph or other picture that is displayed on the external device 90. According to some embodiments, the color of the sample can be used as an input parameter for a purchase to be executed by the external device 90. For example, a user can scan a color and upload an indicator of the color for purchase of paint in the color.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic multipurpose stylus, comprising:
   a main body having a first connector at a first end of the main body and a second connector at a second end of the main body, opposite the first end;
   a controller within the main body;
   a tip module communicatively coupled to the controller of the main body via the first connector and comprising a first functional component, the tip module being exchangeable with other tip modules on the main body;
   a functional end module communicatively coupled to the controller of the main body via the second connector and comprising a second functional component, the functional end module being exchangeable with other functional end modules on the main body, wherein the functional end module is configured to receive a first input corresponding to a first instruction; and
   a communication component within the main body, wherein the communication component is configured to transmit a first signal based on the first instruction from the stylus to an external device to record a setting of the external device, wherein the tip module is configured to receive a second input corresponding to a second instruction, wherein the communication component is configured to transmit a second signal based on the second instruction from the stylus to the external device to record a marking on a display of the external device according to the setting and the second input.

2. The electronic multipurpose stylus of claim 1, wherein:
   the first functional component is configured to perform a first function that is different than a second function of the second functional component;
   the tip module is removable from the main body to expose the first connector;
   the second connector is configured to connect to a charger to charge a power source of the electronic multipurpose stylus; and
   the functional end module is removable from the main body to expose the second connector.

3. The electronic multipurpose stylus of claim 1, wherein the first functional component comprises a tactile sensor that detects when the tip module is pressed against a surface.

4. The electronic multipurpose stylus of claim 1, wherein the first functional component comprises a contact sensor, a capacitive sensor, a touch sensor, a camera, a piezoelectric sensor, a pressure sensor, or a photodiode.

5. The electronic multipurpose stylus of claim 1, wherein the second functional component comprises an orientation detector, a gyroscope, an accelerometer, a biometric reader, a display, a switch, a button, a speaker, a compass, a microphone, a camera, or a voice coil.

6. The electronic multipurpose stylus of claim 1, wherein:
   when the tip module is pressed against the display of the external device, the controller transmits the first instruction to the external device to record the marking on the display; and
   when the functional end module is pressed against the display, the controller transmits the second instruction to the external device to erase the marking on the display.

7. The electronic multipurpose stylus of claim 1, wherein, when the functional end module detects an input, the controller transmits, to the external device, an instruction indicating the setting to be applied to inputs from the tip module.

8. The electronic multipurpose stylus of claim 7, wherein, when the tip module is pressed against the display of the external device, the controller transmits the second instruction to the external device to record the marking on the display according to the setting.

9. The electronic multipurpose stylus of claim 8, wherein the setting is a color, a shape, a thickness, a size, a brightness, or an opacity of the marking.

10. An electronic stylus, comprising:
    a main body;
    a power source;
    a main body connector for connecting to a charger to charge the power source;
    a controller within the main body;
    a communication component within the main body;
    a functional end module comprising a functional component, wherein the functional end module communicates with the controller of the main body via the main body connector,
    wherein the functional end module is removable from the main body to expose the main body connector; and
    a tip module communicatively coupled to the controller of the main body, wherein the functional end module is configured to receive a first input corresponding to a first instruction transmitted from the communication component to an external device to record a setting of the external device, wherein the tip module is configured to receive a second input corresponding to a second instruction transmitted from the communication component to the external device to record a marking on a display of the external device according to the setting and the second input.

11. The electronic stylus of claim 10, wherein the functional end module is exchangeable with other functional end modules on the main body.

12. The electronic stylus of claim 10, wherein the functional component comprises an orientation detector, a gyroscope, an accelerometer, a biometric reader, a display, a switch, a button, a speaker, a compass, a microphone, a camera, or a voice coil.

13. The electronic stylus of claim 10, further comprising a tip module communicatively coupled to the main body via a tip connector, the tip module being at an end of the electronic stylus opposite the functional end module.

14. A method comprising:
receiving a first input at a functional end module of a stylus, the functional end module defining a first terminal end along a longitudinal axis of the stylus when removably attached to a first end of a main body of the stylus;
based on the first input, transmitting a first instruction from the stylus to an external device to record a setting of the external device;
receiving a second input at a tip module of the stylus, the tip module defining a second terminal end along the longitudinal axis of the stylus when removably attached to a second end of the main body of the stylus, the second terminal end being opposite the first terminal end; and
based on the second input, transmitting a second instruction to record a marking on a display of the external device according to the setting and the second input.

15. The method of claim 14, wherein the setting is a color, a shape, a thickness, a size, a brightness, or an opacity of the marking.

16. The method of claim 14, wherein:
receiving the first input comprises scanning a color of an object with an optical sensor of the functional end module; and
the setting comprises an indicator of the color.

17. The method of claim 14, wherein:
transmitting the second instruction comprises transmitting a signal from the tip module to a main body of the stylus via a first connector, wherein the tip module is removable from the main body to expose the first connector; and
wherein transmitting the first instruction comprises transmitting a signal from the functional end module to a main body of the stylus via a second connector, wherein the functional end module is removable from the main body to expose the second connector.

18. A method comprising:
receiving a first input at a first sensor in a tip module of a stylus;
based on the first input, transmitting a first instruction from the stylus to an external device to record a marking on a display of the external device by transmitting a first signal from the tip module to a main body of the stylus via a first connector, wherein the tip module is removable from the main body to expose the first connector;
receiving a second input at a second sensor in a functional end module of the stylus; and
based on the second input, transmitting a second instruction from the stylus to the external device to erase at least a portion of the marking by a second signal from the functional end module to the main body of the stylus via a second connector, different than the first connector, wherein the functional end module is removable from the main body to expose the second connector.

19. The method of claim 18, wherein the tip module is positioned at an end of the stylus opposite the functional end module.

20. The method of claim 18, wherein the second connector is configured to connect to a charger to charge a power source within the main body.

* * * * *